United States Patent [19]

Takamiya

[11] 4,117,808
[45] Oct. 3, 1978

[54] GAS INJECTION SYSTEM FOR INTERNAL COMBUSTION ENGINE
[75] Inventor: Bonnosuke Takamiya, Johyoh, Japan
[73] Assignee: Mitsubishi Jidosha Kogyo Kabushiki Kaisha, Tokyo, Japan
[21] Appl. No.: 802,559
[22] Filed: Jun. 1, 1977
[30] Foreign Application Priority Data
  Jul. 2, 1976 [JP] Japan .................. 51-79263
  Feb. 23, 1977 [JP] Japan .................. 52-19540
[51] Int. Cl.² .......................... F02D 33/02
[52] U.S. Cl. ................. 123/75 B; 123/124 R
[58] Field of Search ........... 123/32 E, 32 ST, 30 C, 123/169 C, 169 CL, 75 B, 124 R, 26

[56] References Cited
U.S. PATENT DOCUMENTS

| | | | |
|---|---|---|---|
| 3,266,234 | 8/1966 | Cook | 123/75 B |
| 3,353,524 | 11/1967 | Sarto | 123/124 R |
| 3,359,958 | 12/1976 | Von Seggern et al. | 123/75 B |
| 3,408,992 | 11/1968 | Von Seggern et al. | 127/75 B |
| 3,479,997 | 11/1969 | Fryer et al. | 123/75 B |
| 3,543,776 | 12/1970 | Suzuki et al. | 127/32 ST |
| 3,659,564 | 5/1972 | Suzuki et al. | 123/32 ST |
| 3,913,541 | 10/1975 | Scott, Jr. | 123/124 R |
| 3,964,451 | 6/1976 | Goto | 123/75 B |
| 3,991,729 | 11/1976 | Natoro | 123/75 B |
| 4,018,204 | 4/1977 | Road, Jr. | 123/124 R |

Primary Examiner—Charles J. Myhre
Assistant Examiner—David D. Reynolds
Attorney, Agent, or Firm—Eidelman, Wolffe & Waldron

[57] ABSTRACT

A gas injection system for an internal combustion engine including a combustion chamber having an inlet port connected to a main intake passage in which a throttle valve is mounted, and an injection bore provided on the combustion chamber and connected to one end of a secondary intake passage which is opened and closed by a secondary inlet valve, said system comprising a port provided in a wall of said main intake passage upstream of the throttle valve and connected to the other end of the secondary intake passage, through which air or an air-fuel mixture is led and strongly injected from said injection bore by a high negative pressure produced in the combustion chamber, and another port provided in the wall of said main intake passage slightly downstream of the throttle valve at its idle-open position, an amount of said injected gas being controlled by a negative pressure produced at said another port.

12 Claims, 13 Drawing Figures

GAS INJECTION SYSTEM FOR INTERNAL COMBUSTION ENGINE

BACKGROUND OF THE INVENTION

This invention relates to an internal combustion engine, particularly to a gas injection system for an internal combustion engine of a motor vehicle.

In conventional internal combustion engines for motor vehicles, since opening of a throttle valve is low and an amount of sucked air is small during idling and light loaded driving of the engine, the velocity of flow of the air-fuel mixture entering from an intake manifold into a cylinder is low at a suction stroke of the engine, thus a swirl produced in the cylinder is weak. As a result, during ignition which is normally taken place at the end of the compression stroke of the engine, the swirl of the mixture retained in the cylinder becomes weaker, so that firing and combustion of the mixture are not adequate. To ensure stable driving of the engine, it is necessary to supply a mixture having an air-fuel ratio which is lower than that of the mixture supplied during medium or high loaded driving of the engine, that is, the richer mixture is required. This results in an increase of fuel consumption as well as increase of amounts of carbon monoxide (CO) and hydrocarbon (HC) contained in exhaust gas due to imperfect combustion of the richer mixture.

Recently, there has been proposed to burn a mixture much leaner than the stoichiometric mixture in order to reduce the amount of CO and HC, particularly the amount of nitrogen oxide ($NO_x$) contained in the exhaust gas. Also, there has been proposed to draw a portion of exhaust gas from an exhaust system of the engine and to mix and burn it with the mixture in the cylinder to reduce the amount of $NO_x$ in the exhaust gas. However, in both cases, firing and combustion of the mixture become insufficient, so that drivability and rate of fuel consumption become worse.

To avoid the above drawbacks, there has been developed an internal combustion engine comprising a combustion chamber having an inlet port connected to a main intake passage in which a throttle valve is mounted, a spark plug having a spark gap facing into the combustion chamber, an injection bore provided near to said spark gap for injecting gas into said combustion chamber in a predetermined direction, and a secondary intake passage connected to the injection bore through a secondary inlet valve. In this arrangement, the gas is strongly injected from the injection bore into the combustion chamber during a suction stroke of the engine. This flow of gas provides a mixture supplied to the combustion chamber with a strong swirl or turbulence and also clears off the combustion gas existing around the spark gap to improve firing and combustion of the mixture, thereby extending a limit of combustion of the lean mixture and improving the fuel consumption and the drivability.

However, the engine of this type has a disadvantage that an area around the spark gap of the plug is overcooled, since a large amount of the gas from the secondary intake passage is injected into the combustion chamber during idling or extremely light loaded driving of the engine. This results in insufficient firing of the mixture to cause misfiring and to have the motion of the engine instabilized during the idling and extremely light loaded driving.

SUMMARY OF THE INVENTION

A main object of this invention is to provide a gas injection system for the internal combustion engine of the motor vehicle, in which an amount of the injected gas from the injection bore (supply of gas into the secondary intake passage) is controlled so as to increase more the amount of the injected gas at a predetermined light loaded driving range than the injected gas amount at the idling or around it. Consequently, a jet effect of the gas from the injection bore is maximum at said predetermined light loaded driving range, thereby preventing instability of the engine idling and a disordered condition of the engine at the extremely light loaded driving due to the excessive injection of the gas, and also preventing deteriorations of the drivability and the fuel consumption.

To achieve this object, this invention provides a gas injection system for an internal combustion engine including a combustion chamber having an inlet port connected to a main intake passage in which a throttle valve is mounted, a spark plug having a spark gap facing into the combustion chamber, an injection bore provided near to said spark gap for injecting gas into said combustion chamber in a predetermined direction, and a secondary intake passage connected to the injection bore through a secondary inlet valve, said system comprising a first port provided in a wall of the main intake passage at a location in which said port is disposed slightly downstream of said throttle valve at an idling position thereof, but disposed upstream of the throttle valve when the latter is turned open, a flow of gas supplied to said secondary intake passage being controlled by a negative pressure produced at said first port so as to increase more the gas flow at a driving range in which said throttle valve is downstream of said first port than the gas flow at a driving range in which said throttle valve is upstream of said first port.

BRIEF DESCRIPTION OF THE DRAWINGS

This invention will be explained by way of example with reference to the accompanying drawings in which.

DESCRIPTION OF THE PREFERRED EMBODIMENTS

Figure 1:
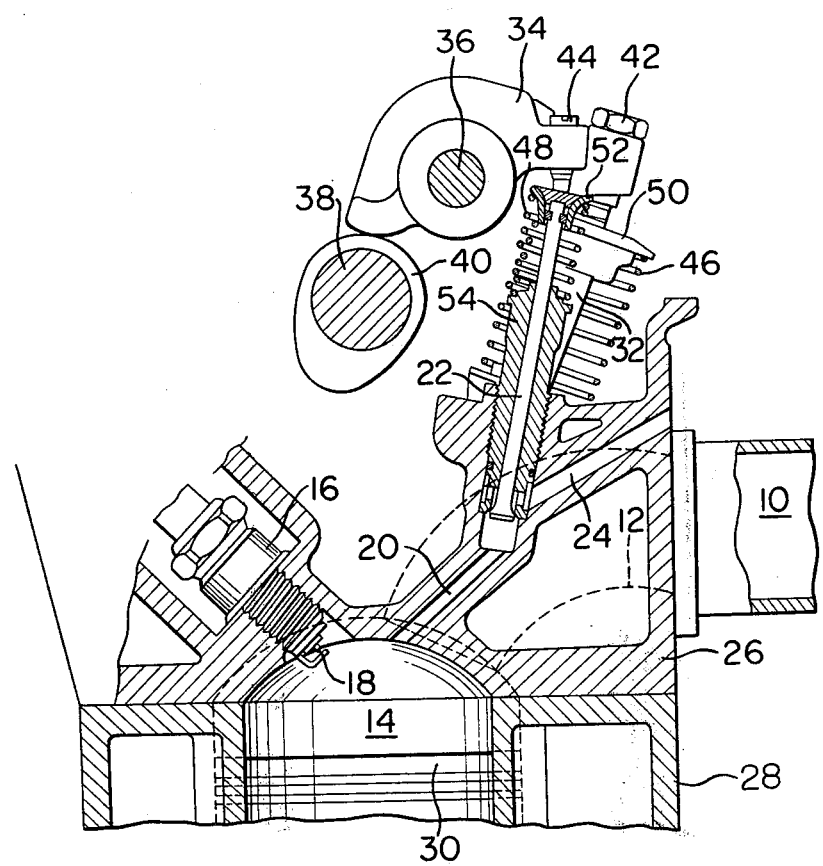
FIG. 1 is a fragmental cross-section of an internal combustion engine for a motor vehicle, which is associated with the gas injection system according to this invention.
Figure 2:
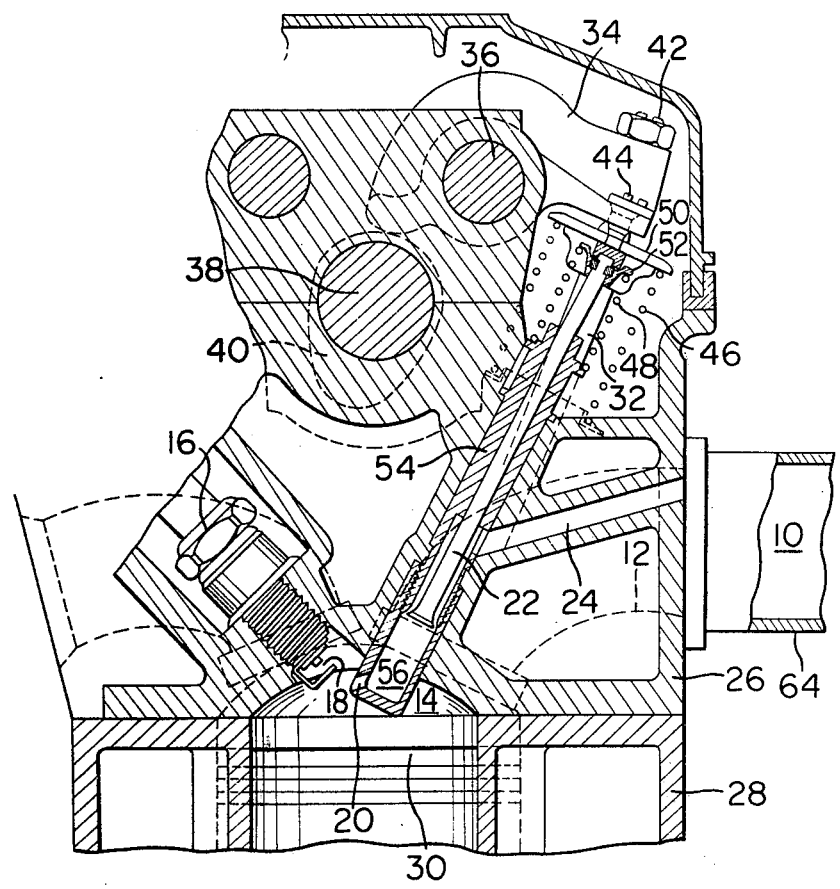
FIG. 2 is a fragmental cross-section of another internal combustion engine for a motor vehicle, which is also associated with the gas injection system according to the invention.

Referring to FIGS. 1 and 2, identical or similar components are designated by the same numerals.

Each embodiment of the internal combustion engine shown in FIG. 1 or 2 is associated with the gas injection system according to the invention. The engine has a main intake passage 10, an inlet port 12 connected thereto and a combustion chamber 14. In the intake passage 10, there is provided a throttle valve (not shown). The combustion chamber 14 is defined by a cylinder head 26, a cylinder block 28 and a piston 30. A spark plug 16 is threadedly fixed to the cylinder head 26 and has a spark gap 18 which faces into the combustion chamber 14.

In the cylinder head 26 of the engine, there is provided near to the spark gap 18 an injection bore 20 for injecting gas into the combustion chamber 14 in a predetermined direction. The injection bore 20 is connected to a secondary intake passage 24 provided in the cylinder head 26 through a secondary inlet valve 22. The secondary inlet valve 22 for opening and closing the secondary intake passage 24 is operated by a rocker arm 34, which also operates a main inlet valve 32 for the inlet port 12, and has a substantially same open and close timing as that of the main inlet valve 32. The rocker arm 34 is fitted on a rocker shaft 36 and has an abutting surface which contacts with a cam 40 provided on a cam shaft 38. The rocker arm 34 engages with the upper ends of the main and secondary inlet valves 32 and 22 through the adjust screws 42 and 44 respectively. A valve spring 46 is disposed between a spring seat 50 on the upper end of the main inlet valve 32 and a portion of the cylinder head 26, and a valve spring 48 is disposed between a spring seat 52 on the upper end of the secondary inlet valve 22 and a valve guide 54 which is fixed to the cylinder head.

During the suction stroke of the engine constructed as above, the gas is strongly injected from the injection bore 20 into the combustion chamber 14. This jet flow of gas produces the strong swirl or turbulence in the mixture supplied to the combustion chamber 14 and also clears off the combustion gas existing around the spark gap 18 to improve firing and combustion of the mixture, thereby extending the limit of combustion of the lean mixture and improving the fuel consumption and the drivability.

Also, in the second embodiment of the internal combustion engine shown in FIG. 2, there is provided near to the spark gap 18 of the plug 16 an injection chamber 56, which is connected to the combustion chamber 14 through the injection bore 20 and to the secondary intake passage 24 through the secondary inlet valve 22. This injection chamber 56 is provided to offer an effect that, after firing of the mixture by the spark plug 16, a portion of flame in the combustion chamber 14 enters into the injection chamber to cause a rapid combustion of the mixture in the latter. As temperature and pressure in the injection chamber 56 become high, the flame therein is strongly forced into the combustion chamber 14 out of the injection bore 20 and a jet stream of the flame produced at this stage accelerates combustion of the mixture progressing in the combustion chamber 14.

A first embodiment of the gas injection system according to this invention will now be explained.

Figure 3:
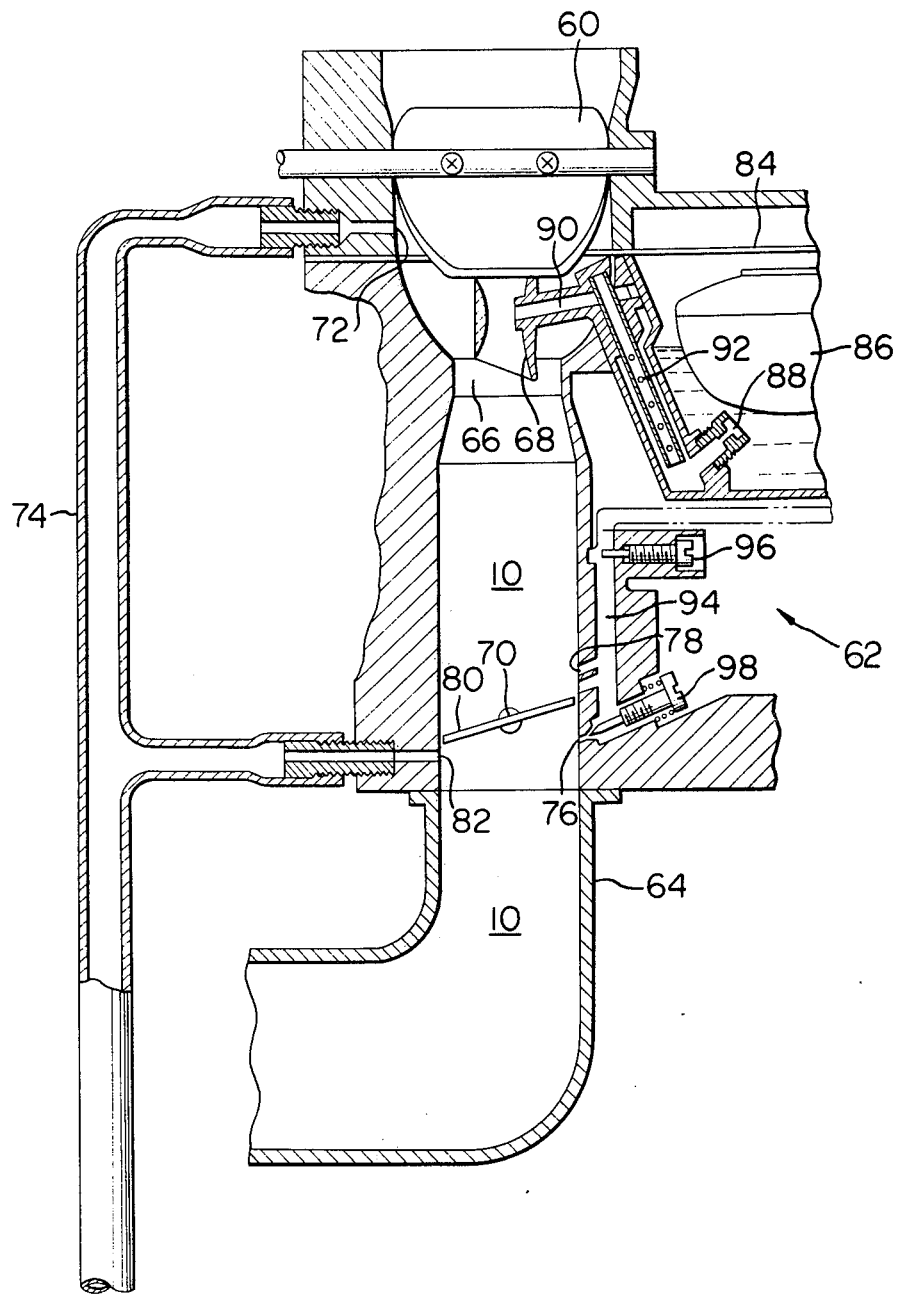
FIG. 3 is a cross-section of a first embodiment of the gas injecting system according to the invention.

In FIG. 3, the main intake passage 10 communicates from an air cleaner (not shown) to the inlet port 12, shown in FIG. 1 or 2, through a choke valve 60, a carburetor 62 and an intake manifold 64. At the carburetor 62 in the main intake passage 10, there is provided an outer venturi 66, an inner venturi 68 and a throttle valve 70. A port 72 is drilled in an inner wall of the main intake passage 10 downstream of the choke valve 60 and upstream of the inner venturi 68. The port 72 is connected to the secondary intake passage 24, shown in FIG. 1 or 2, through a pipe 74. Also, an idle port 76 and a slow port 78 for mainly supplying fuel during idling and light loaded driving of the engine are drilled in the inner wall of the main intake passage 10 near to an idle-open position of the throttle valve 70. Furthermore, a port 82 is drilled in the inner wall of the main intake passage 10 at a location in which it is slightly downstream of the idle-open position of the throttle valve 70 and opposes to a free end 80 of downstream side of the throttle valve 70. This port 82 is communicated to said pipe 74.

Conventionally, the carburetor 62 comprises a float chamber 84, a float 86 provided therein, a main jet 88, a main nozzle 90, a main well 92, a slow-running fuel passage 94, a bypass screw 96 and a pilot screw 98.

According to the construction as described above, most of the air sucked into the main intake passage 10 from the air cleaner is mixed with the fuel in the carburetor 62 to produce a mixture having a predetermined air-fuel ratio, and then sucked into the combustion chamber 14 from the inlet port 12. A portion of the sucked air is led from the secondary intake passage 24 to the injection bore 20 through the port 72 and pipe 74 and injected into the combustion chamber 14 from the injection bore 20. An amount of the injected air and intensity of the jet stream of the air from the injection bore 20 vary according to throttling of the air, which is determined by resistance in the passageway from the port 72 to the injection bore 20 through the pipe 74 and secondary intake passage 24, timing and period of opening of the secondary inlet valve 22, and a degree of opening of the throttle valve 70.

In this embodiment, the port 82 is drilled in the inner wall of the main intake passage 10 at a location in which it is slightly downstream of the idle-open position of the throttle valve 70 and opposes to said downstream side free end 80 thereof, and it communicates to the pipe 74. When the free end 80 of the throttle valve 70 is in a position above or substantially same level with the port 82, that is, when the opening of the throttle is low during the idling and extremely light loaded driving of the engine, a negative pressure produced at the port 82 is high due to the throttling effect of the throttle valve 70. By this high negative pressure, a portion of the air entering into the pipe 74 from the port 72 is again returned into the main intake passage 10 through the port 82. Thus, although the high negative pressure is produced in the combustion chamber 14 during the suction stroke of the engine, a flow of the air injected into the combustion chamber 14 from the injection bore 20 is low and the intensity of the jet stream of air is weak.

When the throttle valve 70 is slightly turned open from the above condition and the free end 80 comes below the port 82, a low negative pressure or substantially atmospheric pressure is produced at the port 82. As a differential pressure between the pressure at the port 82 and the pressure in the main intake passage 10 near to the port 72 becomes weaker, most of the air entering into the pipe 74 from the port 72 is led into the injection bore 20 through the secondary intake passage 24. Accordingly, a large amount of air is injected into the combustion chamber 14 from the injection bore 20 due to the high negative pressure produced in the combustion chamber 14 during the suction stroke of the engine, thereby creating a strong swirl or turbulence of the mixture sucked into the combustion chamber 14 by the jet stream of said air.

In the case that the whole of air entered into an air intake passage (such as the pipe 74 in the embodiment) connected to the secondary intake passage 24 is led into the injection bore 20 therethrough without effecting a negative pressure such as at said port 82 to the air intake passage, as conventional case, an area around the spark gap 18 of the spark plug 16 is over-cooled because of a large amount of the intake air from the secondary intake passage 24 during the idling and extremely light-loaded driving of the engine. This results in deterioration of firing of the mixture to cause misfiring, thereby instabilizing the running of the engine during the idling and extremely light loaded driving.

In the above-described embodiment, since a high negative pressure is produced at the port 82 during the idling and the extremely light loaded driving of the engine so that a portion of the air entered into the pipe 74 is again returned to the main intake passage 10, the amount of air injected from the injection bore 20 is reduced. Thus, the instability of the engine during the idling and extremely light loaded driving is avoided, as well as generation of vibrations of the engine is relieved. Furthermore, drivability of the engine and fuel consumption are improved.

Figure 4:
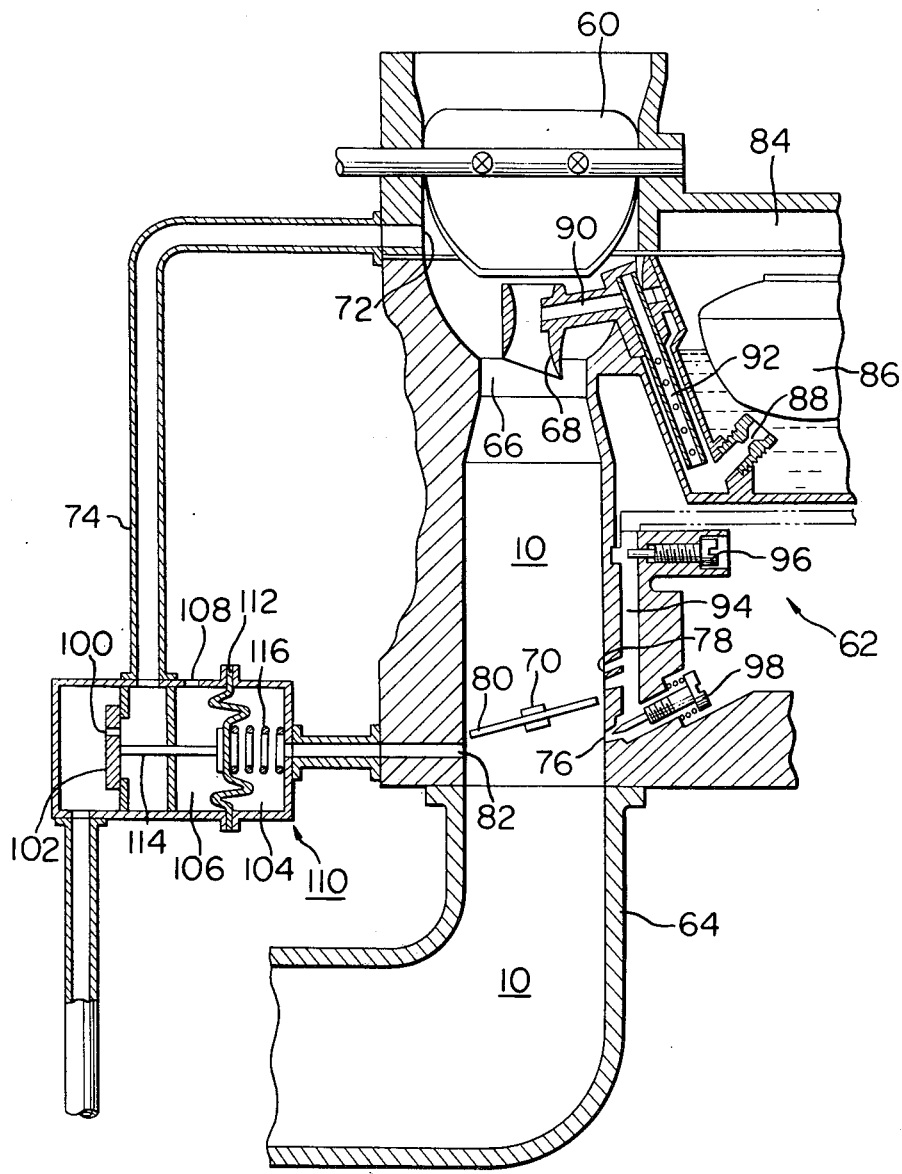
FIG. 4 is a cross-section of a second embodiment of the gas injection system.

In the above embodiment, the pipe 74 communicating to the secondary intake passage 24 is communicated with the port 82 which is drilled in the inner wall of the main intake passage 10 slightly downstream of the fully closed or idle-open position of the throttle valve 70 and opposing to the downstream side free end 80 thereof. In a second embodiment of this invention, as shown in FIG. 4, a control valve 102 having an orifice 100 is mounted in the pipe 74. The control valve 102 is operated by a diaphragm means 110 which has a pair of chambers 104 and 106 separated by a diaphragm 112. The negative pressure produced at said port 82 is communicated to one chamber 104. The other chamber 106 is opened to atmosphere through a bore 108. The control valve 102 is attached to the diaphragm 112 by means of a rod 114. A spring 116 is disposed in said one chamber 104 for normally urging the control 102 toward its open position.

According to this arrangement, as the negative pressure produced at said port 82 is high during the idling and extremely light loaded driving of the engine, the diaphragm 112 is moved in opposition to a biasing force of the spring 116 to the right in FIG. 4 toward a position as illustrated, so that the control valve 102 is closed. Thus, the amount of air led to the injection bore 20 through the secondary intake passage 24 is limited and reduced by the orifice 100. In the driving range other than said idling and light loaded driving, the negative pressure produced at the port 82 becomes low so that the control valve 102 is opened by the biasing force of the spring 116.

Therefore, by using the arrangement of the second embodiment shown in FIG. 4, the same operational effect can be achieved as the first embodiment.

In each of said embodiments, the gas injected from the injection bore 20 is air, but the same effect can be achieved by using other gases such as a mixture of air and fuel.

A third embodiment of this invention will now be explained with reference to FIGS. 5 to 11.

Figure 5:
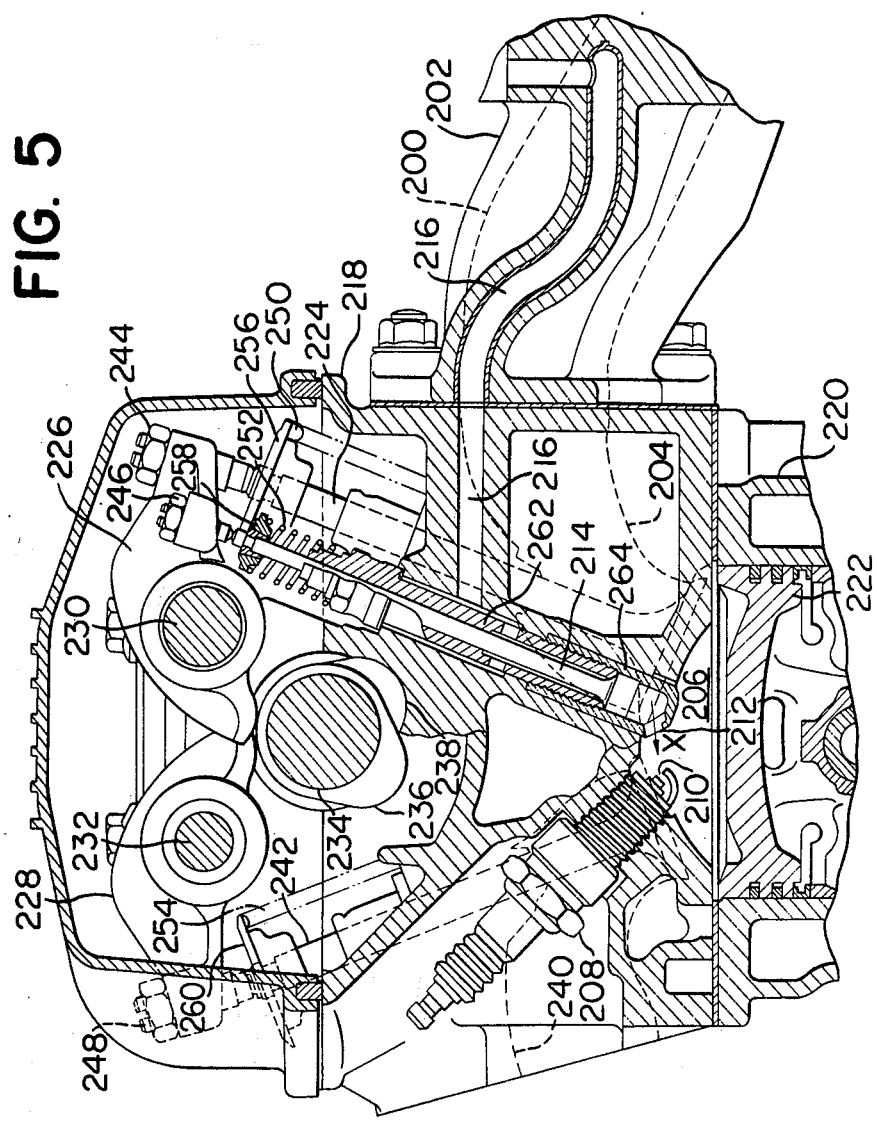
FIG. 5 is a fragmental cross-section of another internal combustion engine for a motor vehicle, which is associated with a third embodiment of the gas injection system according to the invention.
Figure 6:
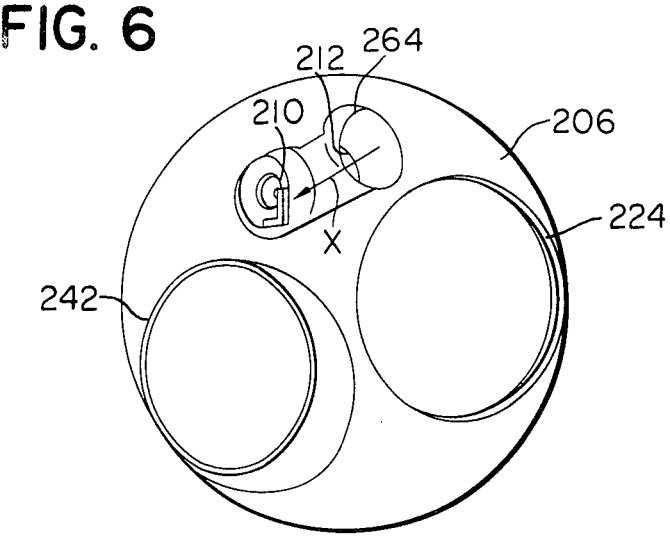
FIG. 6 is a view of a combustion chamber of the engine in FIG. 5, seeing from the underneath of the engine.

This third embodiment is applied to an internal combustion engine shown in FIGS. 5 and 6, similar to FIGS. 1 and 2. The engine has an intake manifold 202 defining a main intake passage 200, an inlet port 204 connected to the manifold and a combustion chamber 206. The combustion chamber 206 is defined by a cylinder head 218, a cylinder block 220 and a piston 222. A spark plug 208 is threadedly fixed to the cylinder head 218 and has a spark gap 210 which faces into the combustion chamber 206.

As similar to FIG. 2, the engine has an injection bore 212 near to the spark gap 210. The injection bore 212 is formed in a nozzle body 264 and adapted to inject the gas into the combustion chamber 206 in a predetermined direction as shown by an arrow X. The injection bore 212 is connected to a secondary intake passage 216 formed in the cylinder head 218 and in the manifold 202 through a secondary inlet valve 214. The secondary inlet valve 214 is adapted to open and close the passage 216 and operated by a rocker arm 226 which also operates a main inlet valve 224. The secondary inlet valve 214 has a substantially same open and close timing as that of the main inlet valve 224. The rocker arm 226 is fitted on a rocker shaft 230 and contacts with a cam 236 provided on a cam shaft 234. The rocker arm 226 engages with the upper ends of the main and secondary inlet valves 224 and 214 through adjust screws 244 and 246 respectively.

The cam shaft 234 has another cam 238 which contacts with a rocker arm 228 on a rocker shaft 232. The rocker arm 228 engages through an adjust screw 248 with an upper end of an exhaust valve 242 which is adapted to open and close an exhaust port 240.

Valve springs 250, 252 and 254 are supported at one ends on valve seats 256, 258 and 260 which are secured to the upper ends of the valves 224, 214 and 242 respectively. The opposite ends of the springs 250 and 254 abut on positions of the cylinder head 218, whereas the other end of the spring 252 is supported on a valve guide 262 for the secondary inlet valve 214. The valve guide 262 and the nozzle body 264 are threaded to each other to be fixed in the cylinder head 218.

During the suction stroke of the engine constructed as above, the gas is strongly injected from the injection bore 212 into the combustion chamber 206, as shown by the arrow X in FIG. 5. This jet flow of gas produces the strong swirl or turbulence in the mixture supplied to the combustion chamber 206 and also clears off the combustion gas existing around the spark gap 210, thereby improving firing and combustion of the mixture.

Figure 7:
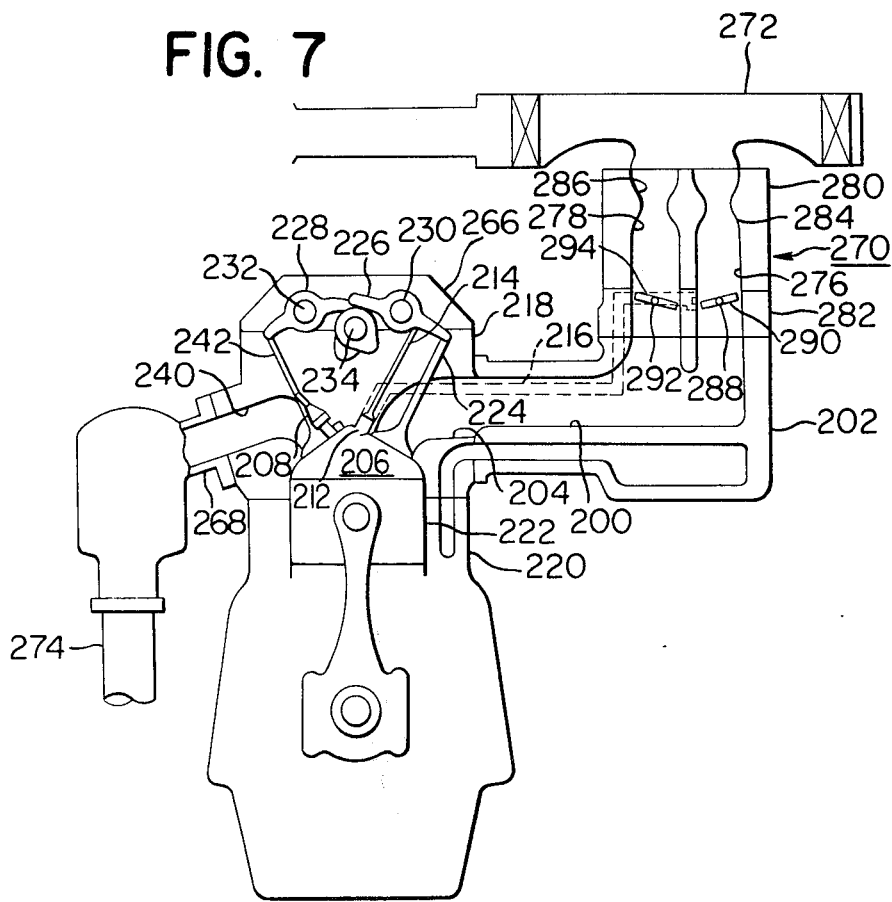
FIG. 7 is a schematic arrangement plan for explaining the entirety of the third embodiment of the gas injection system.
Figure 8:
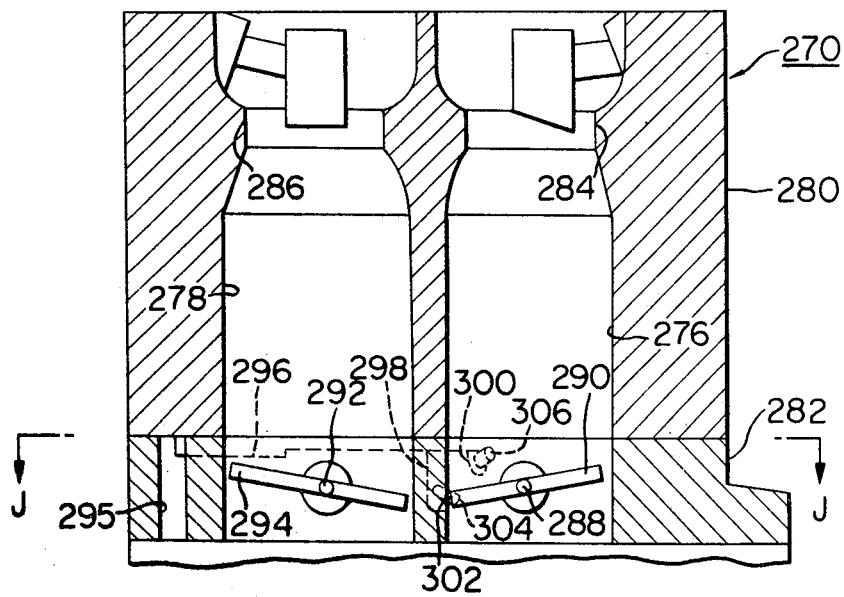
FIG. 8 is an enlarged cross-section of a main portion of said third embodiment of the gas injection system.

FIG. 7 shows a schematic arrangement plan for explaining the entirety of the third embodiment of this invention. The cylinder head assembly of the engine 266 is arranged identically to the construction shown in FIGS. 5 and 6, and components corresponding to those in FIGS. 5 and 6 are designated by the same numerals.

On both sides of the cylinder head 218, the intake manifold 202 and an exhaust manifold 268 are attached. A carburetor 270 is connected to the upper end of the intake manifold 202, and an air cleaner 272 is attached to the top of the carburetor 270.

At the concentrated portion of the exhaust manifold 268 a catalytic convertor (not shown) is located. Exhaust gas is purified by the catalytic convertor and then discharged into atmosphere through an exhaust pipe 274.

The main intake passage 200 communicating from the air cleaner 272 to the inlet port 204 through the carburetor 270 and intake manifold 202. The detailed construction of the carburetor section is explained with reference to FIGS. 8 to 11. The carburetor 270 is a two-barrel type, so that the main intake passage 200 is formed by a primary throttle bore 276 and a secondary throttle bore 278.

The carburetor 270 has a two-divided body consisting of an upper body 280 and a lower body 282. A primary venturi 284 is formed in the bore 276 in the upper body 280 and a secondary venturi 286 is formed in the bore 278 in the upper body.

In the bore 276 in the lower body 282, a throttle valve 290 pivotable about a throttle shaft 288 is provided, whereas a throttle valve 294 is located in the bore 278 in the lower body and pivotable about a throttle shaft 292. The throttle valve 290 is turned through a linkage or cable by operation of an accelerator pedal (not shown) and controls an amount of the intake air and density of mixture mainly in a range between the idling and the medium loading of the engine. The throttle valve 294 is opened above said medium loading by operation of a diaphragm (not shown) which detects negative pressures at the primary venturi 284 and the secondary venturi 286. The valve 294 is closed in the driving range between the idling and the medium loading.

As apparent from FIG. 5, the portion of the secondary intake passage 216 formed in the cylinder head 218 is led between the contacting surfaces of the lower body 282 and the intake manifold 202 through the portion of the secondary intake passage 216 integrally formed within the intake manifold 202. The secondary intake passage 216 is communicated to bores 298 and 300 provided adjacent to the bore 276 by way of a bore 295 extending from the top surface of the lower body 282 to the bottom surface thereof and grooves 296 formed on the top surface of the lower body 282.

Also, a port 304 is drilled in a wall of the bore 276 in the lower body 282. The port 304 is located in a preset position in which it substantially opposes to or is slightly downstream of the end face 302 of the throttle valve 290 when the latter is in its idle-open position, but is upstream of positions of said opposed end face 302 of the throttle valve 290 when the latter is turned open. Also, a port 306 is drilled in the wall of the bore 276 at a location in which it always is sufficiently upstream of positions of the opposed end face 302 of the throttle valve 290. The port 304 is communicated to the bore 298, while the port 306 is communicated to the bore 300.

According to the above arrangement, most of the air sucked from the air cleaner 272 to the main intake passage 200 is mixed with fuel to form a predetermined air-fuel mixture ratio, and then sucked into the combustion chamber 206 from the inlet port 204. A portion of the air is led into the groove 296 through the bores 298 and 300 by the ports 304 and 306 respectively. The air is then led to the injection bore 212 through the bore 295 and the secondary intake passage 216 from the groove 296 and injected into the combustion chamber 206 from the injection bore 212. An amount of the injected air and a strength of the jet flow vary according to the throttling effect, which is determined by resistance in the passageway from the ports 304 and 306 to the injection bore 212 through the secondary passage 216, timing and period of opening of the secondary inlet valve 214, a degree of opening of the throttle valve 290, vehicle speed, etc.

Particularly when the degree of opening of the throttle valve is low, a characteristic of the injected air amount with respect to the opening degree of the throttle valve considerably changes according to variations of diameters and positions of the ports 304 and 306.

Figure 9:
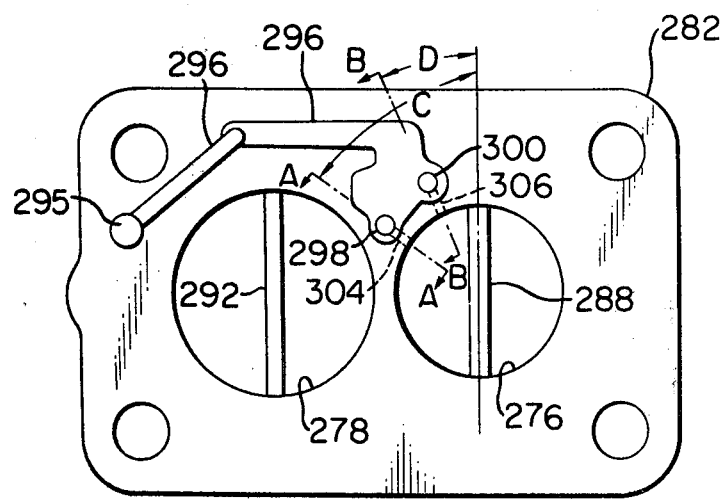
FIG. 9 is a view seeing from the line J—J in FIG. 8.

In this embodiment, the positions of the ports 304 and 306 with respect to an axis of the throttle shaft 288 are angled respectively $C=55°$ and $D=25°$ on a plane having a point on an axis of the bore 276 as a center, as shown in FIG. 9.

Figure 10:
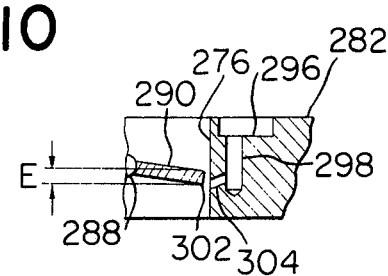
FIG. 10 is a cross-section taken along the line A—A in FIG. 9.
Figure 11:
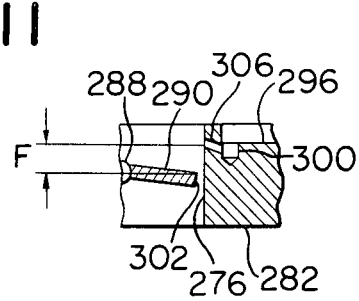
FIG. 11 is a cross-section taken along the line B—B in FIG. 9.

Also, as shown in FIG. 10, the port 304 is positioned below the vertical position of the axis of the throttle shaft 288 by an amount $E=2.5$ to 3.1mm. The port 306 is positioned above said vertical position of the axis of the throttle valve 288 by an amount $F=5.0$mm, as shown FIG. 11. The diameter G of the port 304 is set up 1.9 to $2.5\phi$ while the diameter H of the port 306 is 1.2 to $1.7\phi$. Size of the diameter and an angle at a fully closed position of the throttle valve 290 are $28\phi$ and 8°, whereas those of the throttle valve 294 are $32\phi$ and 8°.

Consequently, during the idling and extremely light loaded driving in which the opening degree of the throttle valve is low, the opposed end face 302 of the throttle valve 290 is in a position higher or substantially same as that of the port 304, so that the negative pressure produced at the port 304 is high because of the throttling effect of the throttle valve 290. By this high negative pressure, a portion of the air entered from the port 306 into the groove 296 through the bore 300 is again returned into the main intake passage 200 by way of the bore 298 and the port 304.

Therefore, a rate of flow of the air injected into the combustion chamber 206 from the injection bore 212 is small and a force of injection is weak, though the high negative pressure is produced in the combustion chamber 206 during the suction stroke of the engine. When the throttle valve 290 is slightly turned open from the above condition and the opposed end face 302 comes below the port 304, the negative pressure produced at the port 304 becomes low, so that a differential pressure between this negative pressure and the pressure in the main intake passage 200 near to the port 306 becomes weaker. Therefore, most of the air entered into the groove 296 from said port 306 is led to the injection bore 212 through the secondary intake passage 216. When the throttle valve 290 is further opened, the negative pressure produced at the port 304 becomes substantially equal to the negative pressure produced at the port 306 and approaches to the atmospheric pressure. Thus, a large amount of the intake air is injected into the combustion chamber 206 from the injection bore 212 due to the high negative pressure produced in the combustion chamber 206 during the suction stroke. Consequently, the air-fuel mixture sucked into the combustion chamber 206 is subjected to the strong swirl on turbulence because of the jet stream of said air.

In this embodiment, it is so arranged that the amount of the secondary air supplied from the injection bore 212 is about 30 to 50% with respect to the total amount of the air during idling. The amount of the secondary air slightly increases at a predetermined light loaded driving range than that at said idling.

In the case that an air intake passage connected to the secondary intake passage 216 is not effected by a negative pressure such as at said port 304 and the air to be injected is taken out from a point which is always in a condition of substantially atmospheric pressure, as conventionally, if an amount of the air is set optimum for a predetermined light loaded driving range, the amount of the air sucked from the secondary intake passage 216 is overmuch during the idling and extremely light loaded driving of the engine. As a result, an area around the spark gap 210 of the spark plug 208 is over-cooled to cause deterioration of firing of the mixture and therefore misfiring, thereby instabilizing the running of the engine during the idling and extremely light loaded driving.

In the above-described embodiment, since the high negative pressure is produced at the port 304 during the idling and extremely light loaded driving so that a portion of the air entered into the groove 296 is again returned to the main intake passage 200, the amount of the air injected from the injection bore 212 is reduced. Thus, the instability of the engine during the idling and extremely light loaded driving is avoided, as well as generation of vibrations of the engine is relieved. Furthermore, drivability of the engine and fuel consumption are improved.

In the embodiment described above, the port 304 is provided at a position remote from the axis of the throttle shaft 288 with an angle of C=55°, whereas the port 306 is located near to the axis of the throttle shaft 288 with an angle of D=25°. This intends to eliminate possibly influence of the negative pressure in the intake manifold to the port 306, which pressure is a high negative pressure produced downstream of the throttle valve 290. This also intends to strongly establish said influence to the port 304 upon the idle-open position of the throttle valve, but this influence is gradually relieved according to opening of the throttle valve 290.

In a system (not shown) in which a choke valve is provided upstream of the venturi 284, a large amount of fuel is injected from a main nozzle (not shown) opening to the venturi 284 during closing of the choke valve.

If the fuel enters excessively from the port 306 and is injected from the injection bore 212, the fuel in a form of liquid adheres to an electrode of the spark plug so that the spark plug 208 does not spark to cause difficulty of starting of the engine. However, in this embodiment, the port 306 is opened far above the throttle valve 290 such as F=5.0mm.

As the port 306 in the above embodiment is opened to the bore 276 between the venturi 284 and the upper face of the throttle valve 290, a mixture having a slight amount of the fuel is sucked from the port 306 during the medium and high loaded driving of the engine. This mixture contacts with the secondary inlet valve 214, nozzle body 264, etc., and the fuel in the mixture is vaporized. Said secondary inlet valve 214, nozzle body 264, etc. are cooled by the heat of vaporization of the fuel, thereby preventing damage by over-heating and preignition.

Figure 12:
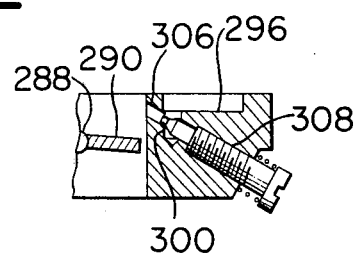
FIG. 12 is a partial cross-section of a modification of the third embodiment.

FIG. 12 shows a modification of the third embodiment, in which an adjust screw 308 is provided in order to regulate a flow area of the port 306 in the third embodiment. Flow of the secondary air is easily modulated to be optimum by adjusting of the screw 308.

Figure 13:
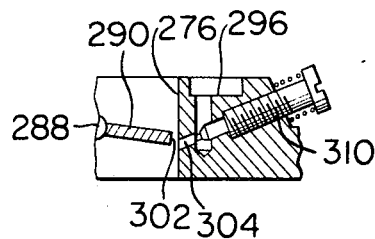
FIG. 13 is a partial cross-section of another modification of the third embodiment.

In the above modification, the flow area of the port 306 can be regulated. Similarly, regulation of the flow of the secondary air is possible by providing an adjust screw 310 in the port 304 to regulate the flow area thereof, as shown in FIG. 13.

In each of said embodiments, the invention is applied to a four-cycle internal combustion engine having a carburetor, but the invention is not limited to them and can be applied to any kind of internal combustion engines of a spark ignition type, such as an internal combustion engine having a fuel injection system.

What is claimed is:

1. A gas injection system for an internal combustion engine including a combustion chamber having an inlet port connected to a main intake passage in which a throttle valve is mounted, a spark plug having a spark gap facing into the combustion chamber, an injection bore provided near to said spark gap for injecting gas into said combustion chamber in a predetermined direction, and a secondary intake passage connected to the injection bore through a secondary inlet valve, said system comprising a first port provided in a wall of said main intake passage at a location in which said port is disposed slightly downstream of said throttle valve at an idling position thereof, but disposed upstream of the throttle valve when the latter is turned open, a flow of the gas supplied to said secondary intake passage being controlled by a negative pressure produced at said first port so as to increase more the gas flow at a driving range in which said throttle valve is downstream of said first port than the gas flow at a driving range in which said throttle valve is upstream of said first port.

2. A gas injection system according to claim 1, wherein said secondary intake passage is communicated to a second port provided in said wall of the main intake passage between said throttle valve which is in the idling position and a choke valve of a carburetor.

3. A gas injection system according to claim 2, wherein said second port is drilled in said wall of the main intake passage between said throttle valve which is in the idling position and a venturi portion of said carburetor.

4. A gas injection system according to claim 2, wherein said first port is communicated to said secondary intake passage upstream of said second inlet valve.

5. A gas injection system according to claim 2, wherein a control valve and an orifice are provided in parallel with each other in said secondary intake passage upstream of said secondary inlet valve, a control means being provided to operate said control valve by the negative pressure produced at said first port, said control valve being closed at said driving range in which said throttle valve is upstream of said first port.

6. A gas injection system according to claim 5, wherein said control means comprises a diaphragm means which has two chambers separated by a diaphragm, one of said two chambers containing a spring and being communicated to said first port, the other chamber opening to atmosphere, said diaphragm and said control valve being connected to each other by means of a rod.

7. A gas injection system according to claim 3, wherein said secondary intake passage is communicated to both of said first port and said second port drilled in the wall of the main intake passage between the throttle valve in the idling position and the choke valve of the carburetor.

8. A gas injection system according to claim 7, wherein said secondary intake passage is formed integrally with a body of the carburetor and an intake manifold of the engine.

9. A gas injection system according to claim 8, wherein said body of the carburetor consists of an upper body having said venturi portion and a lower body in which said throttle valve is located, said first and second ports being communicated to said secondary intake passage through a groove formed in contact surface portions of said upper and lower bodies.

10. A gas injection system according to claim 2, wherein at least one of said first and second ports is provided with a flow control means.

11. A gas injection system according to claim 10, wherein said flow control means comprises an adjust screw which varies a flow area of said one port.

12. A gas injection system according to claim 3, wherein said first port is located at a position remote from a throttle shaft of said throttle valve, whereas said second port is located nearer to said throttle shaft comparing with the position of said first port.

* * * * *